(12) United States Patent
Khajepour et al.

(10) Patent No.: US 12,296,839 B2
(45) Date of Patent: May 13, 2025

(54) LEARNING-MODEL PREDICTIVE CONTROL WITH MULTI-STEP PREDICTION FOR VEHICLE MOTION CONTROL

(71) Applicants: GM Global Technology Operations LLC, Detroit, MI (US); University of Waterloo, Waterloo (CA)

(72) Inventors: Amir Khajepour, Waterloo (CA); Chao Yu, Waterloo (CA); Yubiao Zhang, Sterling Heights, MI (US); Qingrong Zhao, Troy, MI (US); SeyedAlireza Kasaiezadeh Mahabadi, Novi, MI (US)

(73) Assignees: GM GLOBAL TECHNOLOGY OPERATIONS LLC, Detroit, MI (US); UNIVERSITY OF WATERLOO

(*) Notice: Subject to any disclaimer, the term of this patent is extended or adjusted under 35 U.S.C. 154(b) by 261 days.

(21) Appl. No.: 18/060,023

(22) Filed: Nov. 30, 2022

(65) Prior Publication Data
US 2024/0174246 A1    May 30, 2024

(51) Int. Cl.
*B60W 50/10*  (2012.01)
*B60W 40/10*  (2012.01)
*B60W 50/00*  (2006.01)

(52) U.S. Cl.
CPC ............ *B60W 50/10* (2013.01); *B60W 40/10* (2013.01); *B60W 50/0097* (2013.01)

(58) Field of Classification Search
CPC ... B60W 50/10; B60W 40/10; B60W 50/0097
See application file for complete search history.

(56) References Cited

U.S. PATENT DOCUMENTS

| | | | |
|---|---|---|---|
| 7,330,785 | B2 | 2/2008 | Odenthal et al. |
| 10,124,807 | B2 | 11/2018 | Petrucci et al. |
| 10,407,035 | B1 | 9/2019 | Gadda et al. |
| 2006/0267750 | A1 | 11/2006 | Lu et al. |
| 2016/0207458 | A1* | 7/2016 | Pillai ...................... H04N 23/00 |
| 2019/0375394 | A1* | 12/2019 | Maleki .................. B60W 20/11 |
| 2020/0225676 | A1* | 7/2020 | Telpaz ............. B60W 50/0098 |
| 2021/0101434 | A1* | 4/2021 | Sawarynski, Jr. . B60G 17/0152 |
| 2021/0304430 | A1* | 9/2021 | Vendas Da Costa ..... G06T 7/70 |

(Continued)

*Primary Examiner* — Naeem Taslim Alam
(74) *Attorney, Agent, or Firm* — Vivacqua Crane, PLLC

(57) ABSTRACT

A system for learning-model predictive control (LMPC) with multi-step prediction for motion control of a vehicle includes sensors and actuators. One or more control modules each having a processor, a memory, and input/output (I/O) ports are in communication with the sensors and actuators, the processor executing program code portions stored in the memory. The program code portions cause the sensors and actuators to obtain vehicle state information, receive a driver input, and generate a desired dynamic output based on the driver input and the vehicle state information. A program code portion estimates actions of the actuators based on the vehicle state information and the driver input, and utilizes the vehicle state information, the driver input, and the estimated actions of the actuators to select one or more models of a physics-based vehicle model and a machine-learning model of the vehicle to selectively adjust commands to the actuators.

14 Claims, 6 Drawing Sheets

(56) References Cited

U.S. PATENT DOCUMENTS

| | | | | |
|---|---|---|---|---|
| 2022/0178710 A1* | 6/2022 | Panahandeh | ....... | G01C 21/3446 |
| 2023/0422117 A1* | 12/2023 | Li | ..................... | H04W 36/0058 |
| 2024/0300275 A1* | 9/2024 | Anderson | ............ | H02K 7/1823 |

* cited by examiner

LEARNING-MODEL PREDICTIVE CONTROL WITH MULTI-STEP PREDICTION FOR VEHICLE MOTION CONTROL

INTRODUCTION

The present disclosure relates to vehicle motion control systems, and more specifically to systems and methods for adaptively controlling vehicle dynamics and managing performance of vehicle motion control.

Vehicle motion control systems manage vehicle performance in longitudinal and lateral acceleration, pitch, roll, and yaw in a wide variety of ambient and road surface conditions. Such vehicle motion control systems are complex with large numbers of functions interacting with one another. Some current vehicle motion control systems and methods utilize model predictive control (MPC) systems and methodology. However, MPCs utilized in vehicle motion control rely on physics-based models which cannot account for modeling and parameter uncertainties, nor for potential degradation in performance or even failure of a function which may propagate to other functions and result in system performance deterioration or even failure.

Accordingly, while current vehicle motion control systems achieve their intended purpose, there is a need for new and improved systems and methods for vehicle motion control management which reduce the burden on computational resources, increase reliability and robustness and redundancy of the system, provide a means to mitigate deterioration of system components and failures while maintaining or reducing complexity, and which improve vehicle motion control capabilities.

SUMMARY

According to several aspects of the present disclosure, a system for learning-model predictive control (LMPC) with multi-step prediction for motion control of a vehicle includes one or more sensors disposed on the vehicle, the one or more of sensors measuring real-time static and dynamic data about the vehicle. The system further includes one or more actuators disposed on the vehicle, the one or more actuators altering static and dynamic characteristics of the vehicle. The system further includes one or more control modules each having a processor, a memory, and input/output (I/O) ports in communication with the one or more sensors and the one or more actuators, the processor executing program code portions stored in the memory. The program code portions include a first program code portion that causes the one or more sensors and the one or more actuators to obtain vehicle state information, and a second program code portion that receives a driver input and generates a desired dynamic output based on the driver input and the vehicle state information. A third program code portion estimates actions of the one or more actuators based on the vehicle state information and the driver input. A fourth program code portion utilizes the vehicle state information, the driver input, and the estimated actions of the one or more actuators to select one or more models of a physics-based vehicle model and a machine-learning model of the vehicle to selectively adjust commands to the one or more actuators.

In another aspect of the present disclosure the one or more sensors further include at least one of: inertial measurement units (IMUs) capable of measuring orientation in three dimensions, acceleration, and velocity, Semi Active Damping Suspension (SADS) sensors capable of measuring orientation, position, velocity, acceleration in both linear and rotational aspects; global positioning system (GPS) sensors capable of measuring a physical location of the vehicle; wheel speed sensors; throttle position sensors; accelerator position sensors; steering position sensors; and tire pressure monitoring sensors.

In another aspect of the present disclosure the second program code portion receives one or more of: a torque request from the driver; and a steering input from the driver. Based on measurements from the one or more sensors and an estimation of capacities of the one or more actuators, the torque request and the steering input from the driver are converted into a desired dynamic output that approximates vehicle dynamics that the driver input indicates.

In another aspect of the present disclosure the fourth program code portion further receives the vehicle state information, the driver inputs, and the estimated actions of the one or more actuators within the LMPC. The LMPC includes program code for an offline training application and a real-time application.

In another aspect of the present disclosure the offline training application further includes program code that, upon receiving data from the one or more sensors and from the one or more actuators: generates a dataset; evaluates each data point in the dataset for similarity to other data points in the dataset; removes repeated data from the dataset; and upon determining that a new data point in the dataset is within a predefined Euclidean distance of a previous data point in the dataset, removes the previous data point and retains the new data point in the dataset, and upon determining that a new data point in the dataset is not within a predefined Euclidean distance of a previous data point in the dataset, retains the new data point in the data set. Each data point in the dataset corresponds to a distinct vehicle dynamic state.

In another aspect of the present disclosure the real-time application further includes: an online machine learning process that predicts actuator outputs for current vehicle state information based on accumulated data from real-time driving. Predicted actuator outputs are made according to: mean value: $\tilde{x}_{k+i}*|_{i=i,\ldots,N} = K_*^T(K+\sigma_n^2 I)^{-1}$; and variance: $V_{\tilde{x}_{k+i}}*|_{i=1,\ldots,N} = K_{**} - K_*^T(K+\sigma_n^2 I)^{-1} K_*$ where K is a squared exponential kernel function defined as:

$$k(x, x') = \sigma_f^2 \exp\left(-\frac{1}{2l}(x-x')^T(x-x')\right).$$

In another aspect of the present disclosure the real-time application further includes: program code that evaluates reliability of predicted actuator outputs based on a quantity of data points within a predefined Euclidean distance of the predicted actuator outputs and a credible interval of the predicted actuator outputs.

In another aspect of the present disclosure upon determining that online machine learning predicted actuator outputs are reliable, the system utilizes the machine learning model to correct predictions generated through the physics-based model of the vehicle.

In another aspect of the present disclosure upon determining that the online machine learning predicted actuator outputs are less reliable than actuator outputs predicted by the physics-based model, only predictions from the physics-based model are used.

In another aspect of the present disclosure physics-based model predictions are selectively corrected through application of a learning term Oracle: $O^{k+i}=\tilde{x}_{k+i}*-\overline{v}_{k+i}*|_{i=1,\ldots N}$ according to: $\tilde{x}(k+1)=A^k\tilde{x}(k)+B^ku(k)+D^kw(k)+d^k+O^k$ and $\tilde{y}(k+1)=C^k\tilde{x}(k+1)$ and minimizing a cost function: $J=\Sigma_{i=1}^{N_p}(\|Y(k+i)-Y_{des}(k+i)\|_Q^2+\|u(k+i)\|_R^2+\|\Delta u(k+i)\|_P^2)$ where control input constraints are $u_{min}\leq u\leq u_{max}$ and control output constraints are $Y_{min}\leq Y\leq Y_{max}$, such that when the learning term Oracle increases accuracy of the physics-based model predictions, the learning term Oracle is used to correct the physics-based model, and when the learning term Oracle does not alter or decreases accuracy of the physics-based model, only predictions of the physics-based model are used.

In another aspect of the present disclosure a method for learning-model predictive control (LMPC) with multi-step prediction for motion control of a vehicle includes: measuring, by one or more sensors disposed on the vehicle, real-time static and dynamic data about the vehicle and altering static and dynamic characteristics of the vehicle with one or more actuators disposed on the vehicle. The method further includes utilizing one or more control modules each having a processor, a memory, and input/output (I/O) ports in communication with the one or more sensors and the one or more actuators. The processor executes program code portions stored in the memory. The program code portions include program code that: obtains vehicle state information from the one or more sensors and the one or more actuators; receives a driver input and generates a desired dynamic output based on the driver input and the vehicle state information; estimates actions of the one or more actuators based on the vehicle state information and the driver input; and utilizes the vehicle state information, the driver input, and the estimated actions of the one or more actuators to select one or more models of a physics-based vehicle model and a machine-learning model of the vehicle to selectively adjust commands to the one or more actuators.

In another aspect of the present disclosure obtaining vehicle state information from the one or more sensors further includes: measuring orientation of the vehicle with inertial measurement units (IMUs) capable of measuring orientation in three dimensions, acceleration, and velocity; measuring orientation, position, velocity, acceleration in both linear and rotational aspects with Semi Active Damping Suspension (SADS) sensors; measuring a physical location of the vehicle with global positioning system (GPS) sensors. The method further includes measuring wheel speeds with wheel speed sensors, measuring a throttle position with throttle position sensors, measuring accelerator pedal position with accelerator position sensors, measuring steering angle with steering position sensors, and measuring tire pressure with tire pressure monitoring sensors.

In another aspect of the present disclosure the method further includes receiving a torque request from the driver; and receiving a steering input from the driver. Based on measurements from the one or more sensors and an estimation of capacities of the one or more actuators, the torque request and the steering input from the driver are converted into a desired dynamic output that approximates vehicle dynamics that the driver input indicates.

In another aspect of the present disclosure the method further includes: receiving the vehicle state information, the driver inputs, and the estimated actions of the one or more actuators within the LMPC; and executing program code for an offline training application and a real-time application within the LMPC.

In another aspect of the present disclosure further includes: executing the offline training application, including: generating a dataset; evaluating each data point in the dataset for similarity to other data points in the dataset; removing repeated data from the dataset; and upon determining that a new data point in the dataset is within a predefined Euclidean distance of a previous data point in the dataset, removing the previous data point and retains the new data point in the dataset, and upon determining that a new data point in the dataset is not within a predefined Euclidean distance of a previous data point in the dataset, retaining the new data point in the data set. Each data point in the dataset corresponds to a distinct vehicle dynamic state.

In another aspect of the present disclosure the method further includes executing the real-time application, including: predicting actuator outputs with an online learning process, for current vehicle state information based on accumulated data from real-time driving. Predicted actuator outputs are made according to: mean value: $\tilde{x}_{k+i}*|_{i=i,\ldots,N}=K_*^T(K+\sigma_n^2 I)^{-1}$; and variance: $V_{\tilde{x}_{k+i}}*|_{i=1,\ldots,N}=K_{**}-K_*^T(K+\sigma_n^2 I)^{-1}K_*$ where K is a squared exponential kernel function defined as:

$$k(x,x')=\sigma_f^2\exp\left(-\frac{1}{2l}(x-x')^T(x-x')\right).$$

In another aspect of the present disclosure the method further includes evaluating reliability of predicted actuator outputs based on a quantity of data points within a predefined Euclidean distance of the predicted actuator outputs and a credible interval of the predicted actuator outputs.

In another aspect of the present disclosure the method further includes utilizing the machine learning model to correct predictions generated through the physics-based model of the vehicle upon determining that the online machine learning predicted actuator outputs are reliable; and utilizing only predictions from the physics-based model upon determining that the online machine learning predicted actuator outputs are less reliable than actuator outputs predicted by the physics-based model.

In another aspect of the present disclosure the method further includes selectively correcting the physics-based model predictions through application of a learning term Oracle: $O^{k+i}=\tilde{x}_{k+i}*-\overline{v}_{k+i}*|_{i=1,\ldots N}$ according to: $\tilde{x}(k+1)=A^k\tilde{x}(k)+B^ku(k)+D^kw(k)+d^k+O^k$ and $\tilde{y}(k+1)=C^k\tilde{x}(k+1)$ and minimizing a cost function: $J=\Sigma_{i=1}^{N_p}(\|Y(k+i)-Y_{des}(k+i)\|_Q^2+\|u(k+i)\|_R^2+\|\Delta u(k+i)\|_P^2)$, where control input constraints are $u_{min}\leq u\leq u_{max}$ and control output constraints are $Y_{min}\leq Y\leq Y_{max}$, such that when the learning term Oracle increases accuracy of the physics-based model predictions, the learning term Oracle is used to correct the physics-based model, and when the learning term Oracle does not alter or decreases accuracy of the physics-based model, only predictions of the physics-based model are used.

In another aspect of the present disclosure a system for learning-model predictive control (LMPC) with multi-step prediction for motion control of a vehicle includes one or more sensors disposed on the vehicle, the one or more of sensors measuring real-time static and dynamic data about the vehicle. The system further includes one or more actuators disposed on the vehicle, the one or more actuators altering static and dynamic characteristics of the vehicle and one or more control modules each having a processor, a memory, and input/output (I/O) ports in communication with the one or more sensors and the one or more actuators. The processor executes program code portions stored in the memory, the program code portions including: a first program code portion that causes the one or more sensors and the one or more actuators to obtain vehicle state information, and a second program code portion that receives a driver input and generates a desired dynamic output based on the driver input and the vehicle state information. The driver input includes a torque request from the driver; and a steering input from the driver. Based on measurements from the one or more sensors and an estimation of capacities of the one or more actuators, the torque request and the steering input from the driver are converted into a desired dynamic output that approximates vehicle dynamics that the driver input indicates. The program code portions further include a third program code portion that estimates actions of the one or more actuators based on the vehicle state information and the driver input, and a fourth program code portion that utilizes the vehicle state information, the driver input, and the estimated actions of the one or more actuators to select one or more models of a physics-based vehicle model and a machine-learning model of the vehicle to selectively adjust commands to the one or more actuators. The fourth program code portion receives the vehicle state information, the driver inputs, and the estimated actions of the one or more actuators within the LMPC. The LMPC includes program code for an offline training application and a real-time application. The offline training application further includes program code that, upon receiving data from the one or more sensors and from the one or more actuators: generates a dataset; evaluates each data point in the dataset for similarity to other data points in the dataset; removes repeated data from the dataset; and upon determining that a new data point in the dataset is within a predefined Euclidean distance of a previous data point in the dataset, removes the previous data point and retains the new data point in the dataset, and upon determining that a new data point in the dataset is not within a predefined Euclidean distance of a previous data point in the dataset, retains the new data point in the data set. Each data point in the dataset corresponds to a distinct vehicle dynamic state, and the real-time application further includes: an online machine learning process that predicts actuator outputs for current vehicle state information based on accumulated data from real-time driving. Predicted actuator outputs are made according to: mean value: $\tilde{x}_{k+i}^*|_{i=i,\ldots,N} = K_*^T(K+\sigma_n^2 I)^{-1}$; and variance: $V_{\tilde{x}_{k+i}^*}|_{i=1,\ldots,N} = K_{**} - K_*^T(K+\sigma_n^2 I)^{-1}K_*$ where K is a squared exponential kernel function defined as:

$$k(x, x') = \sigma_f^2 \exp\left(-\frac{1}{2l}(x-x')^T(x-x')\right).$$

The real-time application further includes program code that evaluates reliability of predicted actuator outputs based on a quantity of data points within a predefined Euclidean distance of the predicted actuator outputs and a credible interval of the predicted actuator outputs. Upon determining that the online machine learning predicted actuator outputs are reliable, the system utilizes the machine learning model to correct predictions generated through the physics-based model of the vehicle, and upon determining that the online machine learning predicted actuator outputs are less reliable than actuator outputs predicted by the physics-based model, only predictions from the physics-based model are used. Physics-based model predictions are selectively corrected through application of a learning term Oracle: $O^{k+i} = \tilde{x}_{k+i}^* - \bar{v}_{k+i}^*|_{i=1,\ldots,N}$ according to $\tilde{x}(k+1) = A^k\tilde{x}(k) + B^k u(k) + D^k w(k) + d^k + O^k$ and $\tilde{y}(k+1) = C^k\tilde{x}(k+1)$ and minimizing a cost function: $J = \sum_{i=1}^{N_p}(\|Y(k+i) - Y_{des}(k+i)\|_Q^2 + \|u(k+i)\|_R^2 + \|\Delta u(k+i)\|_P^2)$. Control input constraints are $u_{min} \leq u \leq u_{max}$ and control output constraints are $Y_{min} \leq Y \leq Y_{max}$, such that when the learning term Oracle increases accuracy of the physics-based model predictions, the learning term Oracle is used to correct the physics-based model, and when the learning term Oracle does not alter or decreases accuracy of the physics-based model, only predictions of the physics-based model are used.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
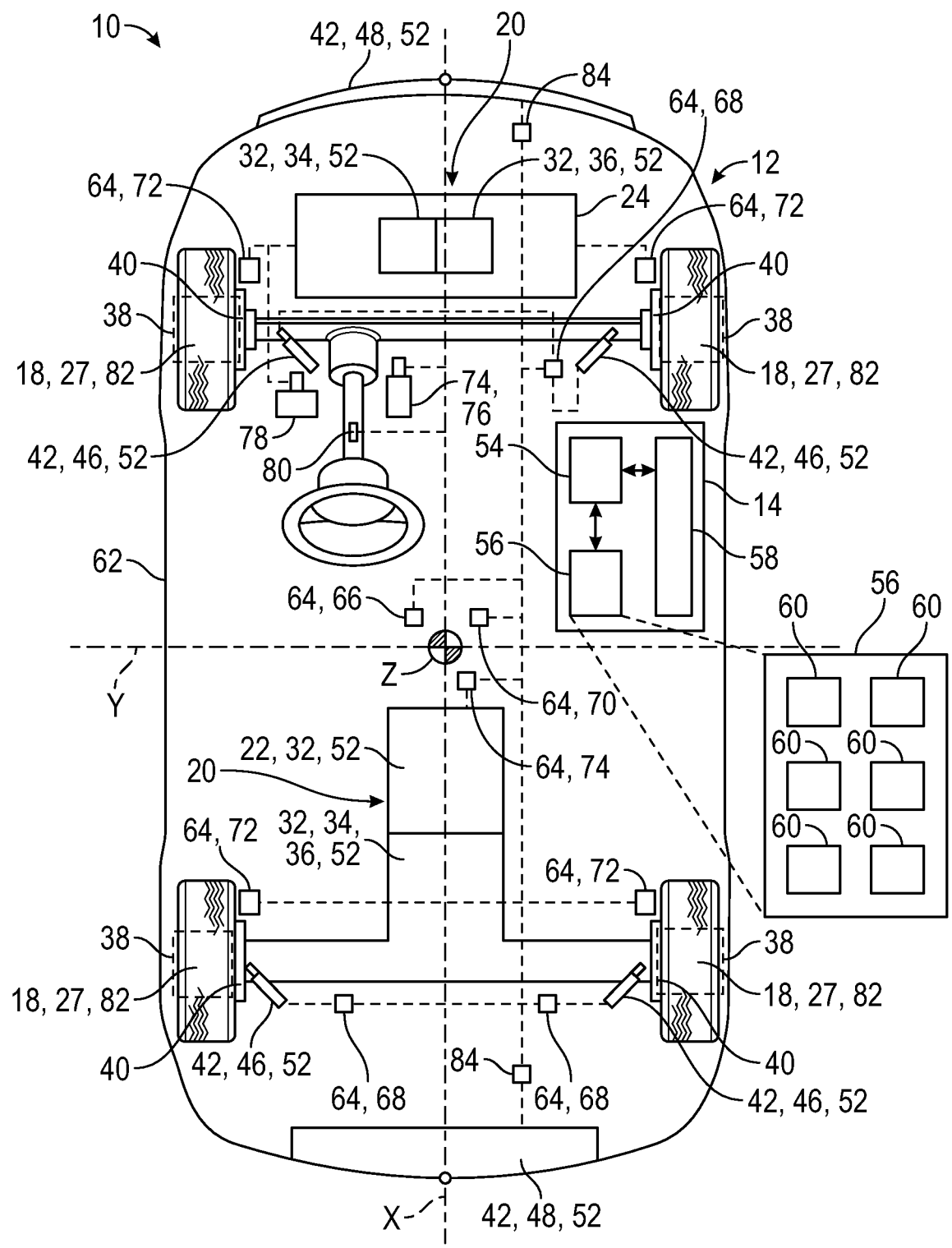
FIG. 1 is a schematic view of a system and method for learning-model predictive control (LMPC) with multi-step prediction for vehicle motion control according to an aspect of the present disclosure.
Figure 2:
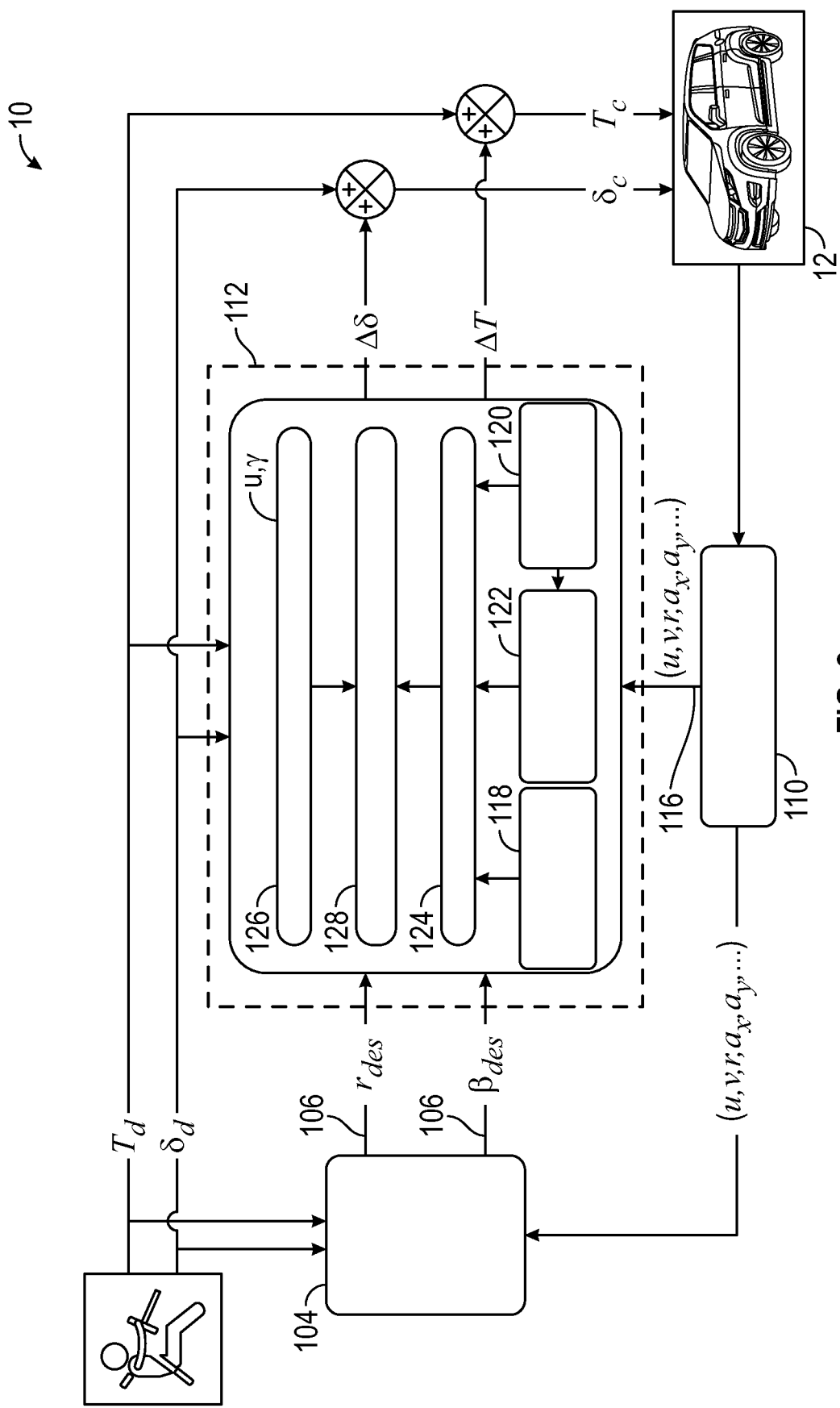
FIG. 2 is a block diagram of a system for learning-model predictive control (LMPC) with multi-step prediction for vehicle motion control according to an aspect of the present disclosure.

Referring to FIGS. 1 and 2, a system 10 for learning-model predictive control with multi-step prediction for vehicle motion control (VMC) is shown. The system 10 includes the vehicle 12 and one or more controllers 14. The vehicle 12 is shown as a car, but it should be appreciated that the vehicle 12 may be a van, bus, tractor-trailer, semi, Sport-Utility Vehicle (SUV), all-terrain vehicle (ATV), truck, tricycle, motorcycle, airplane, amphibious vehicle, or any other such vehicle which makes contact with the ground without departing from the scope or intent of the present disclosure. The vehicle 12 includes one or more wheels 27 having tires 18 and a drivetrain 20. The drivetrain may include a variety of components such as internal combustion engines (ICE) 22 and/or electric motors 24, and transmissions 26 capable of transmitting motive power developed by the ICEs 22 and/or electric motors 24 to the wheels 27, and ultimately to the tires 18 affixed thereto. In one example, the vehicle 12 may include an ICE 22 acting on a rear axle 28 of the vehicle 12 as well as one or more electric motors 24 acting on a front axle 30 of the vehicle 12. It should be appreciated, however, that the vehicle 12 may use one or more ICEs 22, and/or one or more electric motors 24 disposed in other configurations without departing from the scope or intent of the present disclosure. For example, the vehicle 12 may have an ICE 22 acting only on the front axle 30, while one or more electric motors 24 acts solely on the rear axle 28. In further examples, the ICE 22 may act on both front and rear axles 30, 28, and an electric motor may act on both front and rear axles 30, 28.

In several aspects, the drivetrain 20 includes one or more in-plane actuators 32. In-plane actuators 32 may include all-wheel drive (AWD) systems including electronically-controlled or electric AWD (eAWD) 34 systems as well as limited slip differentials (LSDs) including electronically-controlled or electric LSD (eLSD) 36 systems. In-plane actuators 32 including eAWD 34 and eLSD 36 systems can generate and/or modify force generation in X and/or Y directions at a tire 18 to road surface contact patch 38 within a certain predetermined capacity. An eAWD 34 system may transfer torque from front to rear of a vehicle 12 and/or from side-to-side of the vehicle 12. Likewise, an eLSD 36 system may transfer torque from side-to-side of the vehicle 12. In some examples, the eAWD 34 and/or eLSD 36 may directly alter or manage torque delivery from the ICE 22 and/or electric motors 24 and/or the eAWD 34 and eLSD 36 may act on a braking system 40 to adjust a quantity of torque delivered to each of the tires 18 of the vehicle 12.

In further examples, the vehicle 12 may include a means of altering a normal force on each of the tires 18 of the vehicle 12 via one or more out-of-plane actuators 42 such as active aerodynamic actuators 44 and/or active suspension actuators 46. The active aerodynamic actuators 44 may actively or passively alter an aerodynamic profile of the vehicle via one or more active aerodynamic elements 48 such as wings, spoilers, fans or other suction devices, actively-managed Venturi tunnels, and the like. The active suspension actuators 46 such as active dampers 50 or the like. In several aspects, the active dampers 50 may be magnetorheological dampers or other such electrically, hydraulically, or pneumatically-adjustable dampers without departing from the scope or intent of the present disclosure. For the sake of simplicity in the description that follows, ICEs 22, electric motors 24, eAWD 34, eLSD 36, the braking system 40, aerodynamic control system, active aerodynamic elements 48, active dampers 46, and the like will be referred to more broadly as actuators 52.

The terms "forward", "rear", "inner", "inwardly", "outer", "outwardly", "above", and "below" are terms used relative to the orientation of the vehicle 12 as shown in the drawings of the present application. Thus, "forward" refers to a direction toward a front of a vehicle 12, "rearward" refers to a direction toward a rear of a vehicle 12. "Left" refers to a direction towards a left-hand side of the vehicle 12 relative to the front of the vehicle 12. Similarly, "right" refers to a direction towards a right-hand side of the vehicle 12 relative to the front of the vehicle 12. "Inner" and "inwardly" refers to a direction towards the interior of a vehicle 12, and "outer" and "outwardly" refers to a direction towards the exterior of a vehicle 12, "below" refers to a direction towards the bottom of the vehicle 12, and "above" refers to a direction towards a top of the vehicle 12. Further, the terms "top", "overtop", "bottom", "side" and "above" are terms used relative to the orientation of the actuators 52, and the vehicle 12 more broadly shown in the drawings of the present application. Thus, while the orientation of actuators 52, or vehicle 12 may change with respect to a given use, these terms are intended to still apply relative to the orientation of the components of the system 10 and vehicle 12 components shown in the drawings.

The controllers 14 are non-generalized, electronic control devices having a preprogrammed digital computer or processor 54, non-transitory computer readable medium or memory 56 used to store data such as control logic, software applications, instructions, computer code, data, lookup tables, etc., and input/output (I/O) ports 58. Computer readable medium or memory 56 includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 56 excludes wired, wireless, optical, or other communication links that transport transitory electrical or other signals. A non-transitory computer readable memory 56 includes media where data can be permanently stored and media where data can be stored and later overwritten, such as a rewritable optical disc or an erasable memory device. Computer code includes any type of program code, including source code, object code, and executable code. The processor 54 is configured to execute the code or instructions. The vehicle 12 may have controllers 14 including a dedicated Wi-Fi controller or an engine control module, a transmission control module, a body control module, an infotainment control module, etc. The I/O ports 58 may be configured to communicate via wired communications, wirelessly via Wi-Fi protocols under IEEE 802.11x, or the like without departing from the scope or intent of the present disclosure.

The controller 14 further includes one or more applications 60. An application 60 is a software program configured to perform a specific function or set of functions. The application 60 may include one or more computer programs, software components, sets of instructions, procedures, functions, objects, classes, instances, related data, or a portion thereof adapted for implementation in a suitable computer readable program code. The applications 60 may be stored within the memory 56 or in additional or separate memory. Examples of the applications 60 include audio or video streaming services, games, browsers, social media, etc. In other examples, the applications 60 are used to manage body control system functions, suspension control system functions, aerodynamic control system functions, or the like in an exemplary vehicle 12.

Referring to FIG. 2, and with continuing reference to FIG. 1, the system 10 is shown in further detail in the form of a flow diagram. The system 10 utilizes one or more applications 60, stored in memory 56 for managing chassis and driveline actuators 52 of the vehicle 12. In several aspects, the applications 60 include computer-executable program code portions that perform a variety of distinct and/or coordinated functions to manage VMC actions. The computer control code portions operate using a combination of physics-based and machine learning (ML) techniques to model each actuator's 52 functionality as well as the actuator's 52 impact on VMC through body 62 and wheel 27 dynamics, as well as through combined tire 18 slip models, or the like. More specifically, the system 10 receives a driver or occupant input 102 to a driver control interpreter (DCI) 104. The DCI 104 reads a variety of occupant inputs such as steering input, throttle input, braking input, or the like, and interprets the occupant inputs before generating a desired dynamics signal 106 in the form of an actuator output. In a particular example, the DCI 104 may receive a driver brake torque input $T_d$, and/or a driver steering angle input $\delta_d$.

In several aspects, the DCI 104 determines boundaries for optimization and optimal coordination of actuators 52. In complex driving scenarios at or near the limits of tire 18 adhesion, the occupant's inputs may exceed predefined actuator 52 capacities, tire 18 capacities, and the like. Accordingly, the system 10 utilizes a constrained optimization to reallocate sufficient capacity to X and Y directions in real-time and to redistribute tire 18 forces within the functionality and hardware limitations of each of the actuators 52. Out-of-plane actuators 42 can modify normal forces and alter force generation in X and/or Y directions at a tire 18 adhesion limit. The constrained optimization examines whether the current tire 18 capacity is sufficient with actuator 52 functionality and hardware limitations to redistribute tire 18 forces to achieve desired vehicle 12 motion using eAWD 34 and/or eLSD 36, or where tire 18 capacity must be increased via active aerodynamic actuators 44 if increased traction or lateral grip is requested by a occupant of the vehicle 12. The constrained optimization is solved in a real-time fashion to optimally harmonize control commands from different actuators 52 so that vehicle 12 performance capabilities are maximized and so that control interventions are minimized. That is, the vehicle 12 performance capabilities are increased from a first level to a second level greater than the first level so that control interventions, such as: a traction control system (TCS) input, a stability control system input, an antilock braking system (ABS) input, or the like are reduced or substantially eliminated.

The system 10 further includes several control devices, one or more of which may be integrated into a single controller 14, or may be integrated into distinct, separate controllers 14 in electronic communication with one another. The controllers 14 include at least a sensor/estimation module 110 that provides information to the learning-model predictive controller (LMPC) 112. In several aspects, the sensor/estimation module 110 generates estimations 116 for each of the various active chassis and dynamics systems equipped to the vehicle 12. In a particular example, the sensor/estimation module 110 includes an aero model estimation, an eLSD 36 model estimation, an eAWD 34 model estimation, and vehicle dynamics estimations 116. The aero model estimation calculates downforce and maximum downforce possible given current vehicle state information. Likewise, the eLSD 36 model estimation includes clutch torque estimations and maximum clutch torque capacity estimations. The eAWD 34 model estimation produces maximum electric motor 24 torque estimations. Finally, the vehicle dynamics estimations 116 include vehicle states, road surface information, tire 18 force calculations, and road angles.

Each of the torque input and steering angle input $T_d$, $\delta d$ is also received directly by the LMPC 112 along with the DCI 104. The DCI 104 processes the driver or occupant control inputs and generates a DCI output 104 in the form of a desired yaw rate $r_{des}$ and a desired sideslip $\beta_{des}$ which are forwarded to the LMPC 112 as well. The sensor/estimation module 110 provides vehicle state in formation including steering angle $\delta$, speed in a longitudinal direction u, speed in a lateral direction v, yaw rate r, acceleration in a lateral direction $a_y$, acceleration in a longitudinal direction $a_x$, and the like to the LMPC 112. The LMPC 112 receives offline data from a physics-based model 118, a database 120 storing vehicle state and dynamic information acquired experimentally or mathematically, and an online learning-based model 122, and authenticates 124 outputs of the online learning-based model, applies constraints 126, optimizes 128 and generates outputs in the form of brake torque adjustments $\Delta T$ and steering adjustments $\Delta \delta$ which are applied to the torque input and steering angle input $T_d$, $\delta_d$ to provide a corrected brake torque $T_C$, and a corrected steering angle $\delta_C$. The corrected brake torque $T_C$, and a corrected steering angle $\delta_C$ are applied via signals to the various vehicle actuators 52 and vehicle 12 response is detected by the sensors 64 and actuators 52 and forwarded to the sensor/estimation module 110 as an additional input to future calculations at future time steps k+N.

Figure 3:
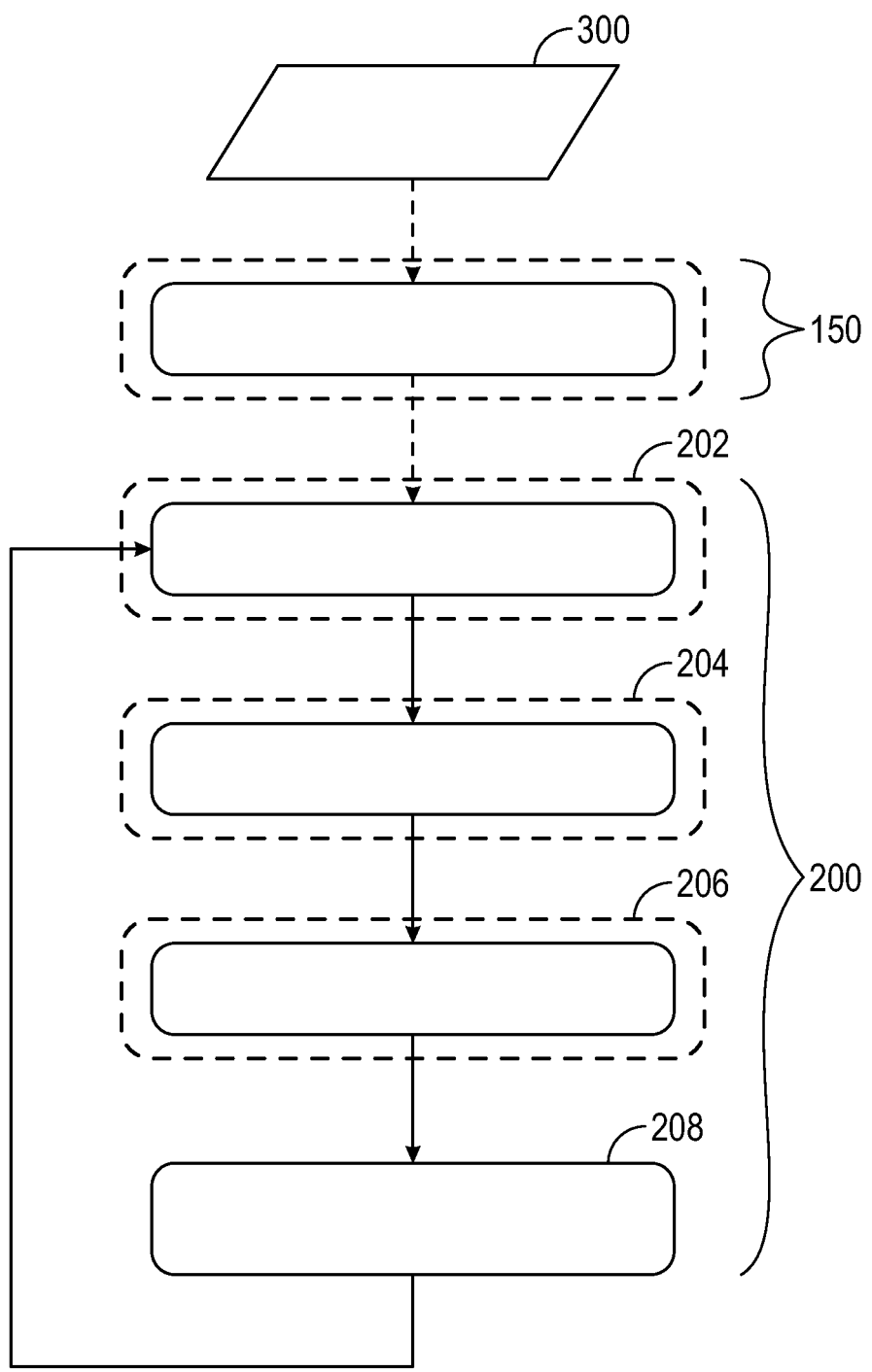
FIG. 3 is a simplified flowchart depicting offline and online portions of a system and method for learning-model predictive control (LMPC) with multi-step prediction for vehicle motion control according to an aspect of the present disclosure.

Referring now to FIG. 3 and with continuing reference to FIGS. 1 and 2, the LMPC 112 is shown in further detail in a flow diagram. The LMPC includes an offline training application 150, and an online real-time application 200.

In several aspects, the offline training application 150 is used to train the model predictive control (MPC) model. In several aspects, the offline training application 150 is used to generate an input to the online real-time application 200. The online real-time application 200 includes an online learning portion 202, a prediction portion 204, a model selection portion 206, and an optimization portion 208 which feeds back into the online learning portion 202.

Figure 4:
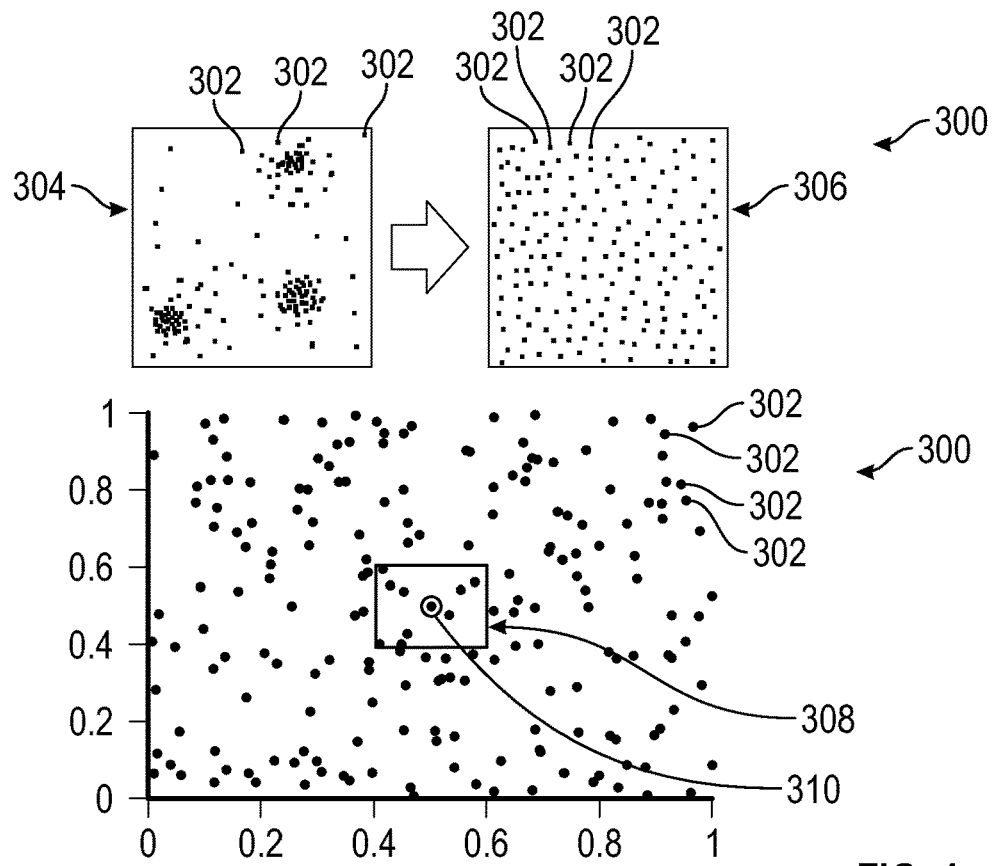
FIG. 4 depicts several datasets and subsets of datasets created through the system and method for learning-model predictive control (LMPC) with multi-step prediction for vehicle motion control according to an aspect of the present disclosure.

Referring now to FIG. 4, and with continuing reference to FIGS. 1 through 3, a dataset 300 for the offline training application 150 is shown in further detail. The dataset 300 is generated through an offline training procedure in which data is collected from the vehicle sensors 64 and actuators 52 as the vehicle 12 is driven through various predefined maneuvers and over varying road conditions. A data logger module, defining or defined within one or more of the controllers 14, labels inputs of each data point 302 including driver or occupant inputs to control devices of the vehicle 12 and vehicle states with the outputs, including yaw rate and lateral velocity of the vehicle 12. The raw dataset 304 is then reconstructed to remove repeated data and retain a minimum reconstructed dataset 306 in the controller 14. Each new data point is evaluated based on a similarity measurement. If there is an existing data point 302 within a predefined distance threshold or proximity to a new data point 302, the new data point 302 is included in the dataset and the older data point 302 is removed from the dataset. If not, the new data point 302 is directly included in the dataset 306.

In order to most accurately predict VMC responses, the offline training application 150 further selects a subset 308 of the dataset 300 rather than the full dataset 300 in order to make timely predictions for real-time functionality in the real-time application 200. Accordingly, the closest data points 302 around an operating point 310 is selected based on a Euclidian distance calculation within the subset 308 of the dataset 300.

The online learning portion 202 or process adapts characteristics based on accumulated data from real-time driving. More specifically, even without known road conditions, the controller 14 still correctly select experience data previously collected on the same road, or on a road with similar road conditions by relying on a projection of sensor data in a yaw-rate and/or lateral acceleration feature dimension. The system 10 may use any of a variety of different machine learning (ML) algorithms to perform the functions characterized within the online learning application 200 without departing from the scope or intent of the present disclosure. In an example, the ML application 60 or algorithm is a Gaussian processing regression (GPR), though as noted above, the ML model may encompass other deep neural networks (DNNs), Kernal regressions, or the like. In several aspects, the GPR is a non-parametric algorithm, however, it should be appreciated that parametric algorithms, including DNNs may be used without departing from the scope or intent of the present disclosure.

Figure 5:
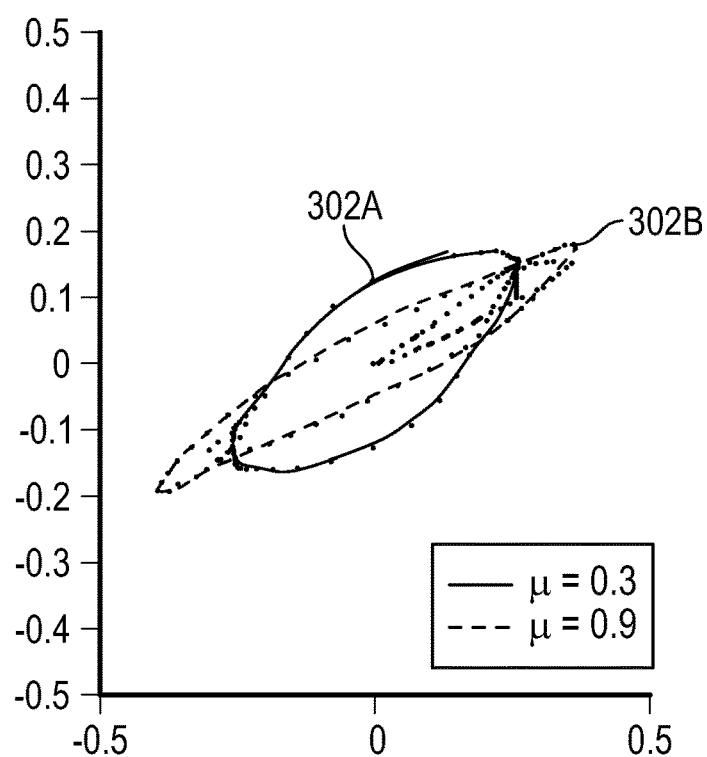
FIG. 5 depicts data corresponding to specific vehicle dynamic situations as determined by the system and method for learning-model predictive control (LMPC) with multi-step prediction for vehicle motion control according to an aspect of the present disclosure.

Referring to FIG. 5 and with continuing reference to FIGS. 1-4, a subset 308 of the dataset 300 is shown including data points 302 indicating different road surface conditions. More specifically data points 302A depict data obtained by sensors 64 gathering data as the vehicle 12 is driven over a road surface with a low coefficient of friction such as approximately μ=0.3. In several aspects, the low coefficient of friction indicates the presence of liquid water, ice, oil, and/or debris, or the like coating at least portions of the road surface.

By contrast, data points 302B depict data obtained by the sensors 64 as the vehicle 12 is driven over a road surface having a high coefficient of friction, such as approximately μ=0.9. In several aspects, the high coefficient of friction is greater than the low coefficient of friction, and indicates a road surface that is substantially dry, uncoated by ice, oil and/or debris or the like. As is clear from the subset 308 of the dataset 300 shown in FIG. 4, the system 10 can identify a clear pattern that identifies road surface coefficients of friction u under a variety of different circumstances through use of a ML algorithm such as GPR, as applied to sensor 64 data retrieved during maneuvering or driving along a road surface under varying conditions.

Figure 6:
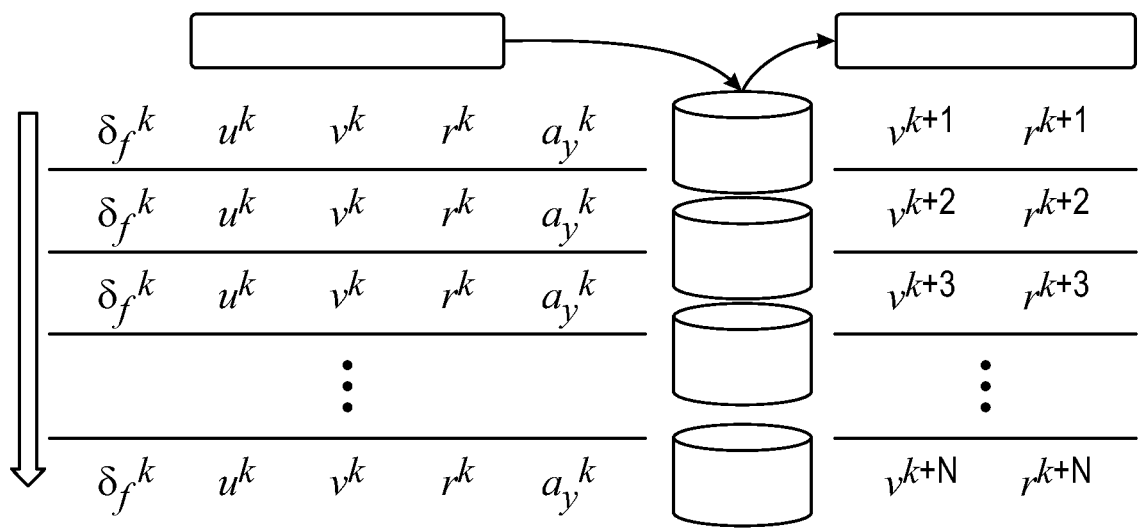
FIG. 6 depicts a prediction portion of a system and method for learning-model predictive control (LMPC) with multi-step prediction for vehicle motion control according to an aspect of the present disclosure.

Referring now to FIGS. 3 and 6, and, and with continued reference to FIGS. 1, 2, 4 and 5, the online learning application 200 subsequently performs the prediction portion 204. In several aspects, the prediction portion 204 is a multi-step process performed with a ML based model. In an example, the system 10 performs predictions with GPR mean value and variance according to:

$$\tilde{x}_{k+i}*|_{i=i,\ldots,N} = K_*^T(K+\sigma_n^2 I)^{-1} y$$

$$V_{\tilde{x}_{k+i}}*|_{i=1,\ldots,N} = K_{**} - K_*^T(K+\sigma_n^2 I)^{-1} K_*$$

where K is a squared exponential kernel function defined as:

$$k(x, x') = \sigma_f^2 \exp\left(-\frac{1}{2l}(x-x')^T(x-x')\right).$$

In several aspects, input variables can be broken down into more specific component parts including, but not limited to input variables containing steering angle $\delta_f^k$, speed in a longitudinal direction $u^k$, speed in a lateral direction $v^k$, yaw rate $r^k$, acceleration in a lateral direction $a_y^k$, acceleration in a longitudinal direction $a_x^k$. Each of the input variables is put into a dataset 300 for each time step, and as the datasets 300 are processed within the GPR. Outputs from the GPR may include speed in a lateral direction $v^{k+N}$ values and yaw rate $r^{k+N}$ values for each time step k+N over a prediction horizon. However, in order to verify that the predictions generated within the prediction portion 204 of the online learning application 200 are valid and applicable to the real-time situation of the vehicle 12, the predictions are authenticated in the model selection portion 206.

Figure 7:
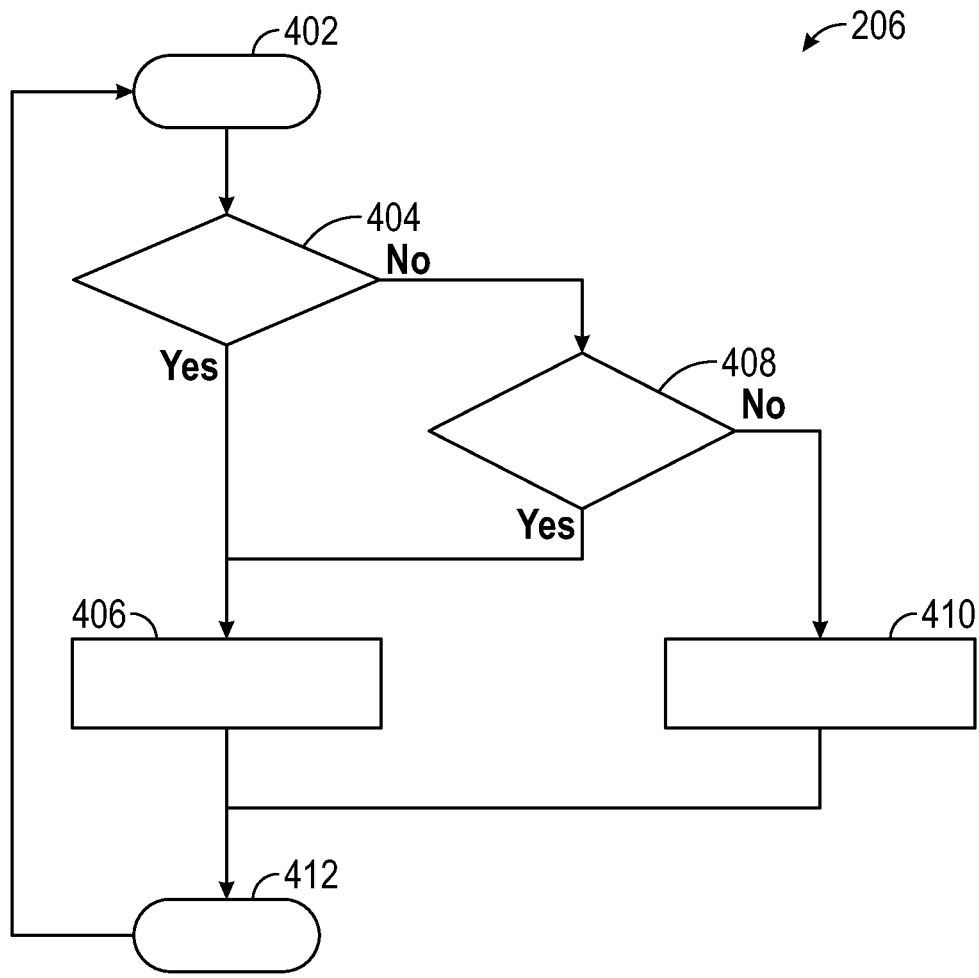
FIG. 7 depicts a flowchart of a method for determining a reliability of predictions generated by the system and method for learning-model predictive control (LMPC) with multi-step prediction for vehicle motion control according to an aspect of the present disclosure.

Turning now to FIGS. 3 and 7 and with continuing reference to FIGS. 1, 2, and 4-6, within the model selection portion 206 the system 10 calculates a reliability of the GPR predictions. More specifically, at block 402, the model selection portion 206 begins an authentication procedure or method where predictions from the GPR are input into the authentication method. At block 404, the model selection portion 206 evaluates physics-based and ML-models ($m_{select}$) of the vehicle 12 in relation to the kernel function $K_m$ based on the quantity of existing data points 302 given current vehicle 12 operating conditions and sensor 64 data. When the models $m_{select}$ have a density of data points 302 less than or equal to those of the kernel function $K_m$, the model selection portion 206 proceeds to block 406 and a nominal physics-based model is used. However, at block 404, when the authentication potion 206 determines that the $m_{select}$ have a density of data points 302 greater than the density of data points 302 of the kernel function $K_m$, the model selection portion 206 proceeds to block 408. At block 408, the model selection portion 206 compares a kernel function confidence interval $K_{CI}$ to a predetermined credible interval CI. In several aspects, the credible interval CI defines a confidence level that corresponds to the reliability of the GPR predictions, given the operating state of the vehicle 12, the sensor 64 data, and the like. In an example, the predetermined credible interval CI may be set to 95%. It should be appreciated, however, that the credible interval CI may be set experimentally and may be set to values other than 95% in accordance with system 10 designs, needs, or the like, without departing from the scope or intent of the present disclosure. Accordingly, at block 408, when the credible interval CI is greater than or equal to the kernel function confidence interval $K_{CI}$, the model selection portion 206 proceeds to block 406 and the physics-based model is used. However, when the credible interval CI is less than the kernel function confidence interval $K_{CI}$, the model selection portion 206 proceeds to block 410 and the ML model is used. In several aspects, when the GPR prediction passes authentication, i.e. the learned model is used, the learned model is used to correct the physics-based model prediction. From each of blocks 406 and 410, the model selection portion 206 proceeds to block 412 where the model selection portion 206 ends. The model selection portion 206 subsequently returns to block 402 where the authentication procedure begins again. It should be appreciated that the model selection portion 206 may run periodically, continuously, only upon the occurrence of a predetermined condition, or the like without departing from the scope or intent of the present disclosure.

Figure 8:
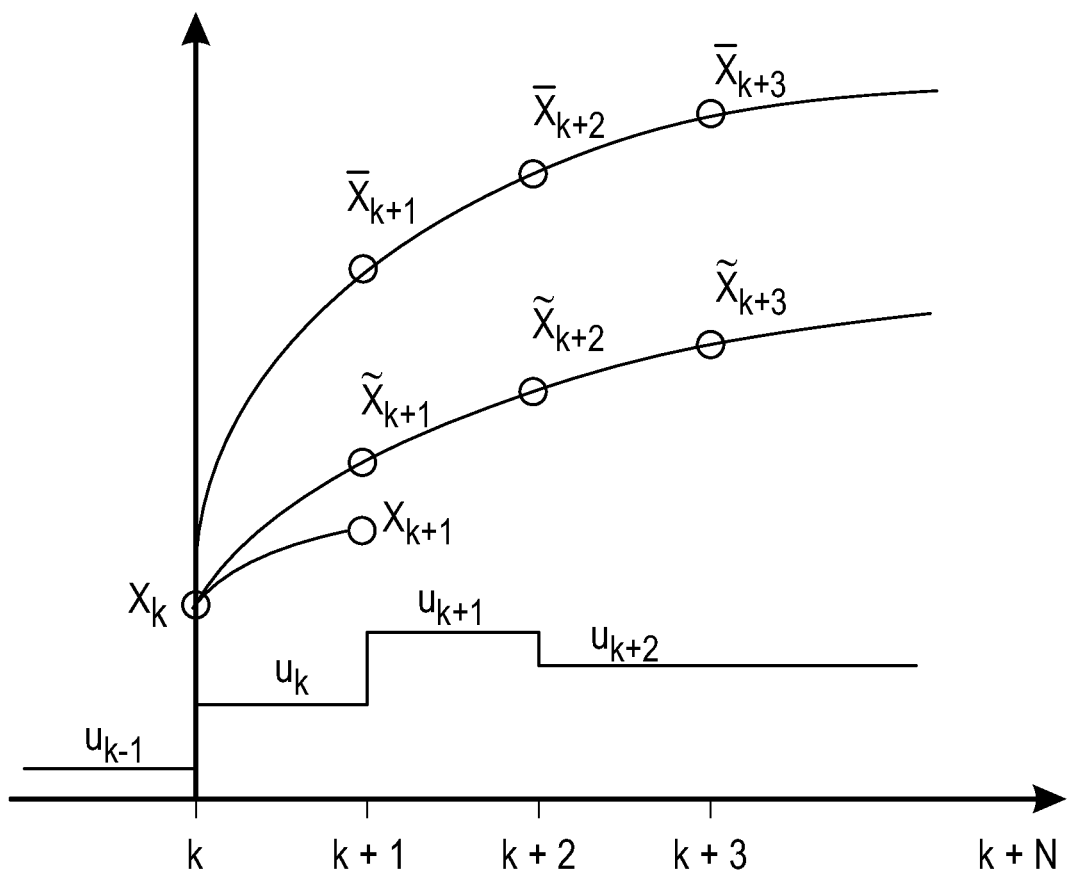
FIG. 8 depicts a series of control inputs, actual vehicle states, and nominal and learning model predictions of a system and method for learning-model predictive control (LMPC) with multi-step prediction for vehicle motion control according to an aspect of the present disclosure.

Referring now to FIGS. 3 and 8, and with continuing reference to FIGS. 1, 2, and 4-7 once the model selection portion 206 is complete, the online real-time application 200 proceeds to block the optimization portion 208. The optimization portion 208 corrects physics-based model predictions with machine-learning though a learning term Oracle $\mathcal{O}$ defined as $\mathcal{O}^{k+i} = \tilde{x}_{k+i}* - \tilde{v}_{k+i}*|_{i=1,\ldots,N}$, according to:

$$\begin{cases} \tilde{x}(k+1) = A^k \tilde{x}(k) + B^k u(k) + D^k w(k) + d^k + \mathcal{O}^k \\ \tilde{y}(k+1) = C^k \tilde{x}(k+1) \end{cases}$$

The learning term Oracle $\mathcal{O}$ is used to correct or amend the physics-based model of the vehicle 12 to more accurately address the environmental and/or dynamic state of the vehicle 12 at each time step than the physics-based model alone. More specifically, the learning term Oracle $\mathcal{O}$ is applied to the physics-based model if the online real-time application 200 determines that the learned model should be used at blocks 406 through 410. In further aspects, the learning term Oracle $\mathcal{O}$ is applied along with constraints to the physics-based model predictions. Constraints for control inputs and outputs may be expressed as $u_{min} \leq u \leq u_{max}$ for control inputs and $Y_{min} \leq Y \leq Y_{max}$ for control outputs. A cost function utilizing the constraints u and Y is applied to optimize control outputs to most accurately address the vehicle 12 dynamic needs. The cost function may be expressed as:

$$J = \sum_{i=1}^{N_p} (\|Y(k+i) - Y_{des}(k+i)\|_Q^2 + \|u(k+i)\|_R^2 + \|\Delta u(k+i)\|_P^2).$$

In several aspects, control inputs u are shown in combination with actual vehicle 12 states x, nominal physics model predictions $\bar{x}$, and learning model predictions $\tilde{x}$ at each time step k through k+N. Broadly speaking, then, the real-time estimation constraints provided through the online real-time application 200 are used to adjust actuator 52 outputs to optimally maintain tire 18 contact with the road surface without slippage. In a particular example, the real-time estimation constraints may be used to restrict torque output to the wheels 27 and tires 18 when the system 10 determines that the road surface has a low coefficient of friction such as $\mu$=0.3. By contrast, torque output may not be restricted, or may be restricted to a lesser extent when the system 10 determines that the road surface has a coefficient of friction greater than $\mu$=0.3, or the like.

A system 10 and method for learning-model predictive control with multi-step prediction for vehicle 12 motion control of the present disclosure offers several advantages. These include reducing the burden on computational resources, increasing reliability and robustness and redundancy of the system, providing a means to mitigate deterioration of system components and failures while maintaining or reducing complexity, and which improving vehicle motion control capabilities over the lifespan of the vehicle 12, and of various vehicle 12 sensors 64 and actuators 52.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for learning-model predictive control (LMPC) with multi-step prediction for motion control of a vehicle, the system comprising:
one or more sensors disposed on the vehicle, the one or more of sensors measuring real-time static and dynamic data about the vehicle;
one or more actuators disposed on the vehicle, the one or more actuators altering static and dynamic characteristics of the vehicle;
one or more control modules each having a processor, a memory, and input/output (I/O) ports in communication with the one or more sensors and the one or more actuators, the processor executing program code portions stored in the memory, the program code portions comprising:

a first program code portion that causes the one or more sensors and the one or more actuators to obtain vehicle state information;
a second program code portion that receives a driver input and generates a desired dynamic output based on the driver input and the vehicle state information;
a third program code portion that estimates actions of the one or more actuators based on the vehicle state information and the driver input; and
a fourth program code portion that utilizes the vehicle state information, the driver input, and the estimated actions of the one or more actuators to select one or more models of a physics-based vehicle model and a machine-learning model of the vehicle to selectively adjust commands to the one or more actuators,
wherein the fourth program code portion further receives the vehicle state information, the driver inputs, and the estimated actions of the one or more actuators within the LMPC, wherein the LMPC includes program code for an offline training application and a real-time application, wherein the offline training application further comprises program code that, upon receiving data from the one or more sensors and from the one or more actuators:
generates a dataset;
evaluates each data point of a plurality of data points in the dataset for similarity to other data points in the dataset;
removes repeated data from the dataset; and
upon determining that a new data point in the dataset is within a predefined Euclidean distance of a previous data point in the dataset, removes the previous data point and retains the new data point in the dataset, and upon determining that the new data point in the dataset is not within the predefined Euclidean distance of the previous data point in the dataset, retains the new data point in the data set; wherein each data point in the dataset corresponds to a distinct vehicle dynamic state, and wherein
the real-time application further comprises:
an online machine learning process that predicts actuator outputs for current vehicle state information based on accumulated data from real-time driving, wherein predicted actuator outputs are made according to a mean value and variance corresponding to a squared exponential kernel function.

2. The system of claim 1 wherein the one or more sensors further comprise at least one of:
inertial measurement units (IMUs) capable of measuring orientation in three dimensions, acceleration, and velocity;
Semi Active Damping Suspension (SADS) sensors capable of measuring orientation, position, velocity, acceleration in both linear and rotational aspects;
global positioning system (GPS) sensors capable of measuring a physical location of the vehicle;
wheel speed sensors;
throttle position sensors;
accelerator position sensors;
steering position sensors; and
tire pressure monitoring sensors.

3. The system of claim 1 wherein the second program code portion receives one or more of:
a torque request from the driver; and
a steering input from the driver,
wherein based on measurements from the one or more sensors and an estimation of capacities of the one or more actuators, the torque request and the steering input from the driver are converted into a desired dynamic output that approximates vehicle dynamics that the driver input indicates.

4. The system of claim 1 wherein the real-time application further comprises program code that evaluates reliability of predicted actuator outputs based on a quantity of data points within a predefined Euclidean distance of the predicted actuator outputs and a credible interval of the predicted actuator outputs.

5. The system of claim 4 wherein upon determining that online machine learning predicted actuator outputs are reliable, the system utilizes the machine learning model to correct predictions generated through the physics-based vehicle model of the vehicle.

6. The system of claim 5 wherein upon determining that the online machine learning predicted actuator outputs are less reliable than actuator outputs predicted by the physics-based vehicle model, only predictions from the physics-based vehicle model are used.

7. The system of claim 1 wherein physics-based vehicle model predictions are selectively corrected through application of a learning term Oracle
and minimizing a cost function
such that when the learning term Oracle increases accuracy of the physics-based vehicle model predictions, the learning term Oracle is used to correct the physics-based vehicle model, and when the learning term Oracle does not alter or decreases the accuracy of the physics-based vehicle model predictions, only the predictions of the physics-based vehicle model are used.

8. A method for learning-model predictive control (LMPC) with multi-step prediction for motion control of a vehicle, the method comprising:
measuring, by one or more sensors disposed on the vehicle, real-time static and dynamic data about the vehicle;
altering static and dynamic characteristics of the vehicle with one or more actuators disposed on the vehicle;
utilizing one or more control modules each having a processor, a memory, and input/output (I/O) ports in communication with the one or more sensors and the one or more actuators, the processor executing program code portions stored in the memory, the program code portions comprising:
obtaining vehicle state information from the one or more sensors and the one or more actuators;
receiving a driver input and generates a desired dynamic output based on the driver input and the vehicle state information;
estimating actions of the one or more actuators based on the vehicle state information and the driver input; and
utilizing the vehicle state information, the driver input, and the estimated actions of the one or more actuators to select one or more models of a physics-based vehicle model and a machine-learning model of the vehicle to selectively adjust commands to the one or more actuators;
receiving the vehicle state information, the driver inputs, and the estimated actions of the one or more actuators within the LMPC; and
executing program code for an offline training application, including:
generating a dataset;
evaluating each data point of a plurality of data points in the dataset for similarity to other data points in the dataset;
removing repeated data from the dataset; and
upon determining that a new data point in the dataset is within a predefined Euclidean distance of a previous data point in the dataset, removing the previous data point and retains the new data point in the dataset, and upon determining that the new data point in the dataset is not within the predefined Euclidean distance of the previous data point in the dataset, retaining the new data point in the data set; wherein each data point in the dataset corresponds to a distinct vehicle dynamic state; and
and executing a real-time application within the LMPC, including:
predicting actuator outputs, with an online machine learning process, for current vehicle state information based on accumulated data from real-time driving, wherein predicted actuator outputs are made according to a mean value and a variance corresponding to a squared exponential kernel function.

9. The method of claim 8 wherein obtaining vehicle state information from the one or more sensors further comprises:
measuring orientation of the vehicle with inertial measurement units (IMUs) capable of measuring orientation in three dimensions, acceleration, and velocity;
measuring orientation, position, velocity, acceleration in both linear and rotational aspects with Semi Active Damping Suspension (SADS) sensors;
measuring a physical location of the vehicle with global positioning system (GPS) sensors;
measuring wheel speeds with wheel speed sensors;
measuring a throttle position with throttle position sensors;
measuring accelerator pedal position with accelerator position sensors;
measuring steering angle with steering position sensors; and
measuring tire pressure with tire pressure monitoring sensors.

10. The method of claim 8 further comprising:
receiving a torque request from the driver; and
receiving a steering input from the driver,
wherein based on measurements from the one or more sensors and an estimation of capacities of the one or more actuators, the torque request and the steering input from the driver are converted into a desired dynamic output that approximates vehicle dynamics that the driver input indicates.

11. The method of claim 8 further comprising:
evaluating reliability of predicted actuator outputs based on a quantity of data points within a predefined Euclidean distance of the predicted actuator outputs and a credible interval of the predicted actuator outputs.

12. The method of claim 11 further comprising:
utilizing the machine learning model to correct predictions generated through the physics-based vehicle model of the vehicle upon determining that online machine learning predicted actuator outputs are reliable; and
utilizing only predictions from the physics-based vehicle model upon determining that the online machine learning predicted actuator outputs are less reliable than actuator outputs predicted by the physics-based model.

13. The method of claim 11 further comprising:
selectively correcting the physics-based vehicle model predictions through application of a learning term Oracle and minimizing a cost function
such that when the learning term Oracle increases accuracy of the physics-based vehicle model predictions, the learning term Oracle is used to correct the physics-based vehicle model, and when the learning term Oracle does not alter or decreases the accuracy of the physics-based vehicle model predictions, only the predictions of the physics-based vehicle model are used.

14. A system for learning-model predictive control (LMPC) with multi-step prediction for motion control of a vehicle, the system comprising:
one or more sensors disposed on the vehicle, the one or more of sensors measuring real-time static and dynamic data about the vehicle;
one or more actuators disposed on the vehicle, the one or more actuators altering static and dynamic characteristics of the vehicle;
one or more control modules each having a processor, a memory, and input/output (I/O) ports in communication with the one or more sensors and the one or more actuators, the processor executing program code portions stored in the memory, the program code portions comprising:
a first program code portion that causes the one or more sensors and the one or more actuators to obtain vehicle state information;
a second program code portion that receives a driver input and generates a desired dynamic output based on the driver input and the vehicle state information, wherein the driver input includes a torque request from the driver; and
a steering input from the driver, wherein based on measurements from the one or more sensors and an estimation of capacities of the one or more actuators, the torque request and the steering input from the driver are converted into a desired dynamic output that approximates vehicle dynamics that the driver input indicates;
a third program code portion that estimates actions of the one or more actuators based on the vehicle state information and the driver input;
a fourth program code portion that utilizes the vehicle state information, the driver input, and the estimated actions of the one or more actuators to select one or more models of a physics-based vehicle model and a machine-learning model of the vehicle to selectively adjust commands to the one or more actuators, wherein the fourth program code portion receives the vehicle state information, the driver inputs, and the estimated actions of the one or more actuators within the LMPC, wherein the LMPC includes program code for an offline training application and a real-time application, wherein the offline training application further comprises program code that, upon receiving data from the one or more sensors and from the one or more actuators:
generates a dataset;
evaluates each data point of a plurality of data points in the dataset for similarity to other data points in the dataset;
removes repeated data from the dataset; and
upon determining that a new data point in the dataset is within a predefined Euclidean distance of a previous data point in the dataset, removes the previous data point and retains the new data point in the dataset, and upon determining that the new data point in the dataset is not within the predefined Euclidean distance of the previous data point in the dataset, retains the new data point in the data set; wherein each data point in the dataset corresponds to a distinct vehicle dynamic state, and
wherein the real-time application further comprises:
an online machine learning process that predicts actuator outputs for current vehicle state information based on accumulated data from real-time driving, wherein predicted actuator outputs are made according to a
mean value and a
variance corresponding to a squared exponential kernel function defined as:
wherein the real-time application further comprises program code that evaluates reliability of predicted actuator outputs based on a quantity of data points within a predefined Euclidean distance of the predicted actuator outputs and a credible interval of the predicted actuator outputs, wherein upon determining that the online machine learning predicted actuator outputs are reliable, the system utilizes the machine learning model to correct predictions generated through the physics-based vehicle model of the vehicle, and upon determining that the online machine learning predicted actuator outputs are less reliable than actuator outputs predicted by the physics-based vehicle model, only predictions from the physics-based vehicle model are used, and
wherein physics-based vehicle model predictions are selectively corrected through application of a learning term Oracle;
and minimizing a cost function such that when the learning term Oracle increases accuracy of the physics-based vehicle model predictions, the learning term Oracle is used to correct the physics-based vehicle model, and when the learning term Oracle does not alter or decreases accuracy of the physics-based vehicle model, only predictions of the physics-based model vehicle are used.

* * * * *